(12) United States Patent
Heinonen et al.

(10) Patent No.: US 10,484,307 B2
(45) Date of Patent: *Nov. 19, 2019

(54) METHOD OF OPERATING A NETWORK ENTITY

(71) Applicant: NOKIA SOLUTIONS AND NETWORKS OY, Espoo (FI)

(72) Inventors: Johanna Heinonen, Espoo (FI); Hannu Flinck, Helsinki (FI); Tapio Sakari Partti, Helsinki (FI); Jarmo Tapio Hillo, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/112,549

(22) PCT Filed: Jan. 20, 2014

(86) PCT No.: PCT/EP2014/050975
§ 371 (c)(1),
(2) Date: Jul. 19, 2016

(87) PCT Pub. No.: WO2015/106827
PCT Pub. Date: Jul. 23, 2015

(65) Prior Publication Data
US 2016/0337270 A1    Nov. 17, 2016

(51) Int. Cl.
*H04L 12/931* (2013.01)
*H04L 12/46* (2006.01)
*H04L 12/725* (2013.01)
*H04L 12/721* (2013.01)
*H04W 4/70* (2018.01)
(Continued)

(52) U.S. Cl.
CPC .......... *H04L 49/70* (2013.01); *H04L 12/4633* (2013.01); *H04L 45/3065* (2013.01); *H04L 45/38* (2013.01); *H04W 4/70* (2018.02); *H04L 43/026* (2013.01); *H04W 76/22* (2018.02)

(58) Field of Classification Search
CPC .............. H04L 12/4633; H04L 43/026; H04L 45/3065; H04L 45/38; H04L 49/70; H04W 4/005; H04W 76/041
See application file for complete search history.

(56) References Cited

U.S. PATENT DOCUMENTS

2010/0238946 A1* 9/2010 Lu .................. H04L 47/2441
370/412
2012/0303835 A1* 11/2012 Kempf ............... H04W 24/02
709/235

(Continued)

FOREIGN PATENT DOCUMENTS

WO   WO 2012/160465 A1   11/2012
WO       2013127429 A1    9/2013

OTHER PUBLICATIONS

IP.com Patent search; Jun. 10, 2019 (Year: 2019).*
(Continued)

*Primary Examiner* — Benjamin H Elliott, IV
(74) *Attorney, Agent, or Firm* — Squire Patton Boggs (US) LLP

(57) ABSTRACT

A method of operating a network entity of a network comprising a gateway (200) is provided, wherein the method comprises dynamically changing a GTP termination point (204, 227) in the gateway (200).

18 Claims, 2 Drawing Sheets

(51) Int. Cl.
*H04L 12/26* (2006.01)
*H04W 76/22* (2018.01)

(56) References Cited

U.S. PATENT DOCUMENTS

| | | | | |
|---|---|---|---|---|
| 2013/0054761 A1* | 2/2013 | Kempf | ............... | H04L 12/4633 |
| | | | | 709/220 |
| 2013/0121207 A1* | 5/2013 | Parker | ................. | H04L 67/10 |
| | | | | 370/254 |
| 2013/0229987 A1* | 9/2013 | Turanyi | ................ | H04W 8/06 |
| | | | | 370/328 |
| 2014/0026169 A1* | 1/2014 | Ye | ........................ | H04L 47/35 |
| | | | | 725/62 |
| 2015/0110095 A1* | 4/2015 | Tan | ..................... | H04W 40/02 |
| | | | | 370/338 |
| 2016/0219082 A1* | 7/2016 | Lindgren | ............. | H04L 63/306 |
| 2016/0337270 A1* | 11/2016 | Heinonen | ............. | H04L 49/70 |
| 2017/0099612 A1* | 4/2017 | Salot | ................ | H04W 28/0215 |
| 2017/0142032 A1* | 5/2017 | Heinonen | ............. | H04L 49/70 |

OTHER PUBLICATIONS

IP.com NPL search; Jun. 10, 2019 (Year: 2019).*
International Search Report & Written Opinion dated Jan. 5, 2015 corresponding to International Patent Application No. PCT/EP2014/050975.
James Kempf et al., "Moving the Mobile Evolved Packet Core to the Cloud," 2012 IEEE 8th International Conference on Wireless and Mobile Computing, Networking and Communications (WIMOB 2012): Barcelona, Spain, Oct. 8-10, 2012, pp. 784-791, XP002717394.
European Patent Office, European Examination Report Application No. 14 701 024.3 dated Mar. 6, 2018.
European Examination Report issued in corresponding European Patent Application No. 14 701 024.3-1231 dated Dec. 10, 2018.
Chinese Office Action issued in corresponding Chinese Patent Application No. 201480073726.6 dated Oct. 12, 2018.
Chinese Office Action issued in corresponding Chinese Patent Application No. 201480073726.6 dated Jun. 26, 2019.
European Office Action issued in corresponding European Patent Application No. 14 701 024.3-1231 dated Oct. 2, 2019.

* cited by examiner

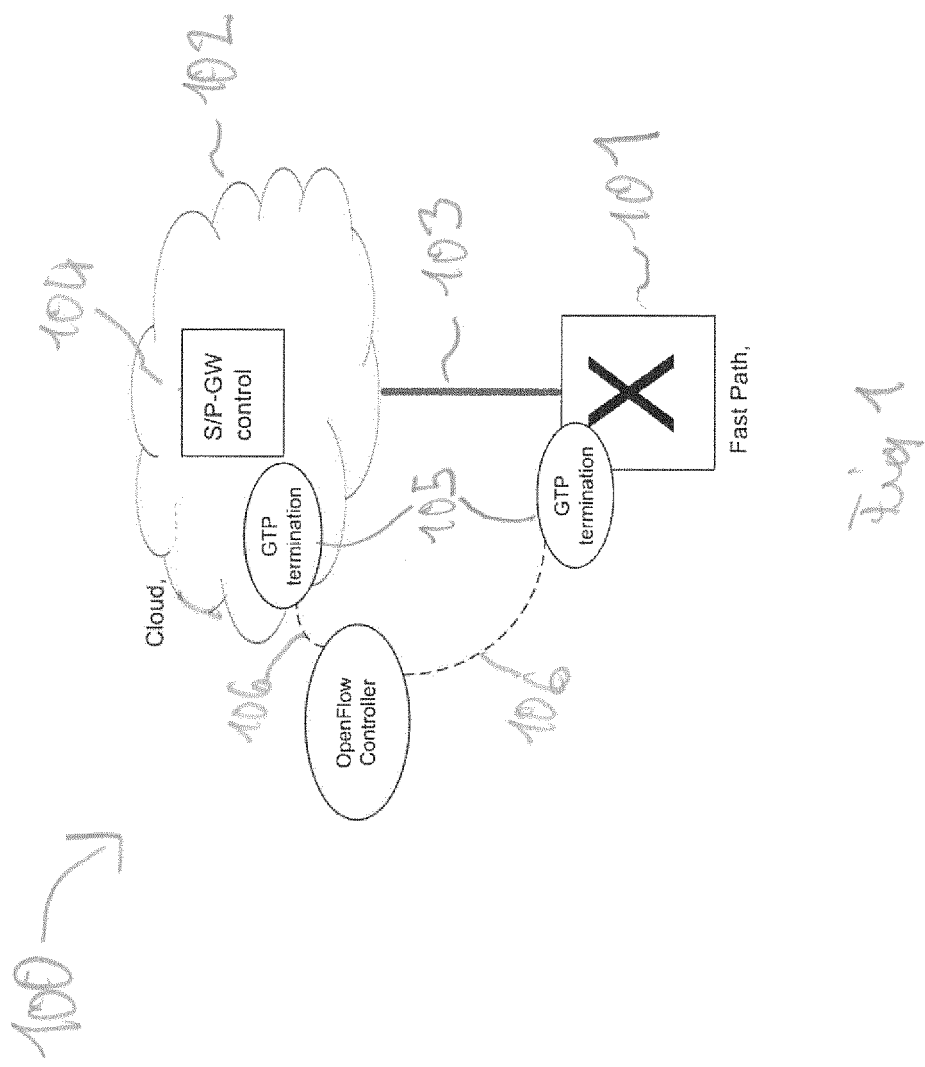

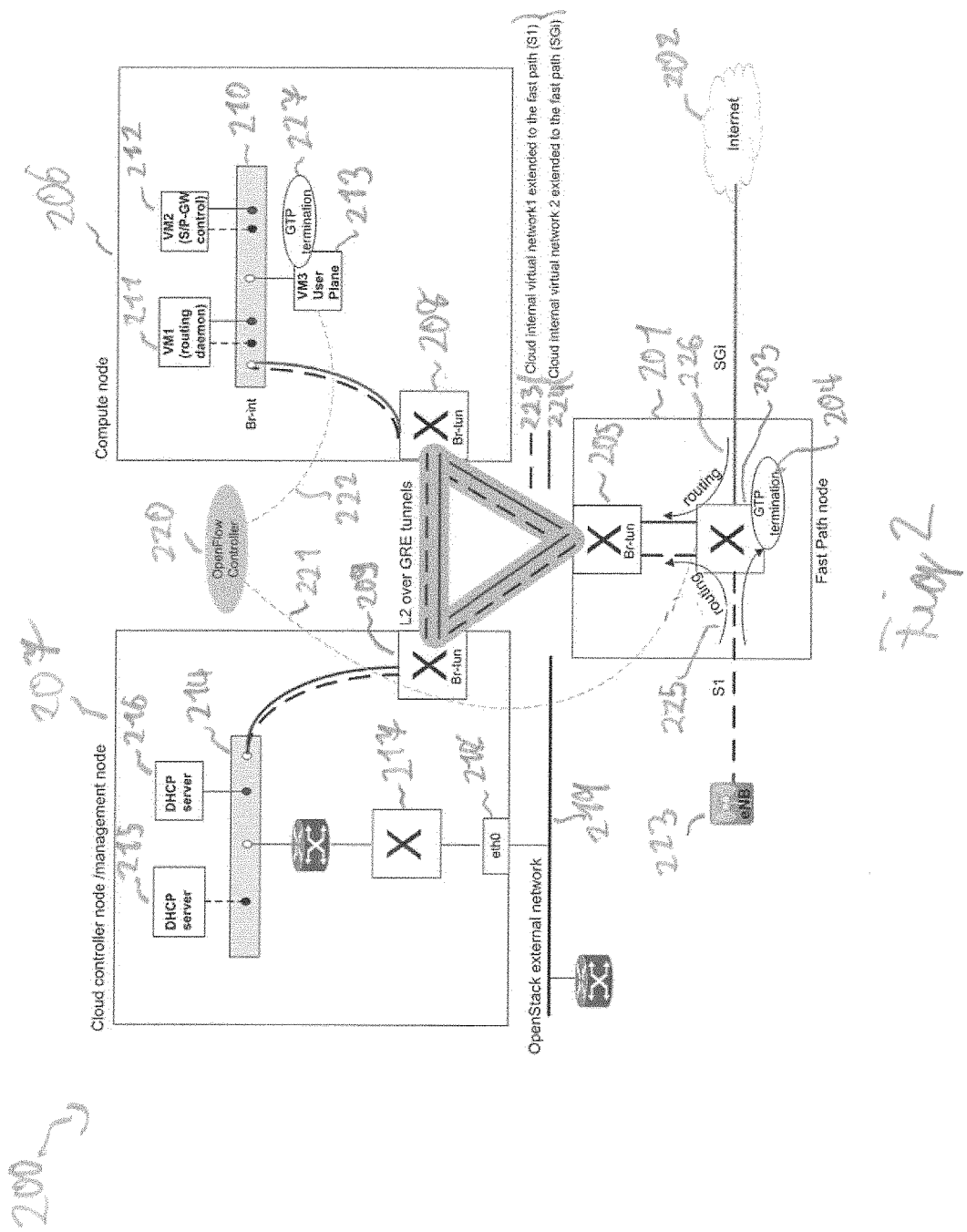

METHOD OF OPERATING A NETWORK ENTITY

FIELD OF INVENTION

The present invention relates to a method of operating a network entity or network element, e.g. of a communication network or computing network, in particular a method of GTP termination in a network. Furthermore, it relates to a network entity, e.g. a gateway in a network, in particular a virtualized gateway. Moreover, it relates to a network, e.g. a communication network or computing network, a program element and a computer-readable medium.

ART BACKGROUND

Virtualization and software defined networking (SDN) technologies are currently changing the principles and used practices in computing and networking areas. Cost reduction in computing and storage areas has been achieved by means of server virtualization in multitenant virtualized data centers. Server virtualization decouples operating system from underlying hardware and offers each tenant a pool of isolated virtualized resources that can be provisioned on-demand and workload can be balanced within and across data centers.

Network Functions Virtualization (NFV)—an operator-led ETSI ISG—aims to use standard IT virtualization technology to implement network functions in software and utilize standard high volume servers, switches and storage located in datacenters and network nodes.

In the networking area, SDN is an approach that allows dynamic network configuration in real-time. OpenFlow protocol that is developed by Open Network Foundation (ONF) is an example of dynamic programming between logically centralized controller and packet forwarding switch.

When applying virtualization and SDN principles to evolved packet core (EPC) packet gateways (S/P-GW), control functionalities are virtualized and implemented in the cloud. Fast path packet processing and GTP termination is separated from the control functions by using OpenFlow protocol. GTP termination can be implemented either in the fast path (possibly located in a distant site) with dedicated hardware or in the general purpose hardware in the cloud.

Typically, in virtualized gateways, where user plane handling is separated from control plane functionalities, all 3GPP signaling interfaces are terminated to the S/P-GW control element. During an attach procedure, "Create session request" message from S1 interface triggers a creation of GTP encapsulation and decapsulation flows to the selected user plane switch. In order to do this, S/P-GW control element communicates with OpenFlow controller via Northbound API. OpenFlow controller together with OpenFlow protocol may be the enabler of the communication between control plane and user plane.

One problem is that flow entries that implement GTP encapsulation/decapsulation are user specific (each UE has GTP TEID and IP address of its own) and it is not possible to aggregate them. This means that the user plane switch has to hold state for each active UE. However, the size of flow tables in the switches is limited. One solution is to terminate all sessions with low bandwidth and non-real time traffic (e.g. M2M contexts) to the cloud and keep only sessions that have real time, high bandwidth traffic in the fast path.

SUMMARY

However, there may be a need to provide a more flexible method of operating a network.

This need may be met by a method of operating a network entity, a network entity for a network, a network, a computer readable medium and a program element, according to the independent claims. Further embodiments are described by the dependent claims.

According to an exemplary aspect a method of operating a network entity of a network comprising a gateway is provided, wherein the method comprises dynamically changing a GTP termination point (or mobility anchor point) in the gateway. (GTP=GPRS tunnelling Protocol)

In particular, the gateway may be a serving gateway (S-GW) and/or a packet data network gateway (P-GW). GTP or GPRS Tunneling Protocol refers to a group of IP-based communication protocols used to carry general packet radio service (GRPS) within GSM, UMTS and LTE networks.

According to an exemplary aspect a network entity for a network is provided, wherein the network entity is adapted to perform a method according to an exemplary aspect.

In particular, the network entity may comprise a controller, a processing unit, or a computing unit adapted to perform the method according to a method according to an exemplary aspect. According to an exemplary aspect, the controller, processing unit, and computing unit may be a virtual controller, virtual processing unit, and virtual computing unit, respectively.

According to an exemplary aspect a network is provided comprising at least two network entities according an exemplary aspect which are connected to each other by a communication link.

In particular, the communication link may be a communication line, a radio link or the Internet.

According to another exemplary aspect a program element is provided, which, when being executed by a processor, is adapted to control or carry out a method according to an exemplary aspect.

According to another exemplary aspect a computer-readable medium is provided, in which a computer program is stored which, when being executed by a processor, is adapted to control or carry out a method according to an exemplary aspect.

The term "network entity" may particular denote any entity, device, unit or element of a network, either virtual or physical which forms part of a network. Examples of a network entity may be a gateway, a fast path node, a cloud or cloud computing network, computing unit, base station or the like.

The term "gateway" may particularly denote a network entity or network node of a first network which is adapted to interface with another network which is different to the first one. For example, the first network and the another network may use different protocols.

By providing a method enabling a dynamic switching or changing of a GTP termination point it may be possible to provide a more flexible operation network, e.g. a communication or computer network. Furthermore, it may be possible to separate user plane handling from S/P-GW control functionalities, so that the user plane and control plane are scaling independently. Thus, it may be possible that the GTP termination point (user plane element) can be selected optimally for each UE. There may also be cases where dynamic switching of GTP termination point of an active session is useful—this enables the movement of mobility anchor between cloud and fast path.

Summarizing a gist of an exemplary aspect may be to provide a method of operating a network entity wherein a GTP termination point may be dynamically changed or shifted, thus potentially improving the flexibility of the network entity and thus of the whole network and communication or data transfer in the network. In particular, it may be possible to dynamically optimize a location of a termination point or mobility anchor point even during an ongoing session.

In the following further embodiments of the method of operating a network entity of a network will be described. However, the described components and features may also be used in connection with the network entity, the network, the program element and the computer-readable medium.

According to an exemplary embodiment of the method the gateway is a virtualized gateway.

According to an exemplary embodiment of the method the gateway further comprises a fast path node including a fast path switch, wherein the user data packets arriving at the gateway via the fast path switch.

In particular, all user data packets may arrive at the gateway via the fast path switch.

The term "fast path" may particularly denote a path with a shorter instruction length through a program, algorithm or routine compared to the "normal path" therefore handling commonly occurring tasks more efficiently than the "normal path". For example, dedicated packet routing hardware used to build computer or communication networks will often include hardware dedicated to handle the most common kinds of packets, with other kinds, for example with control information or packets directed at the device itself instead of to be routed elsewhere, put on the "normal path", in this example usually implemented by software running on the control processor.

According to an exemplary embodiment of the method the gateway further comprises a cloud comprising a virtual switch connected to the fast path switch.

According to an exemplary embodiment of the method the virtual switch of the cloud and the fast path switch operate on the same communication protocol.

In particular, the communication protocol may be the OpenFlow protocol. Thus, the virtual switch and the fast path switch may be under control of the same communication protocol, e.g. OpenFlow, or may operate under the same protocol. The use of the same communication protocol may ease the possibility to change the GTP termination point dynamically even during ongoing sessions.

According to an exemplary embodiment of the method the changing of the GTP termination point is initiated by a trigger.

In particular, the trigger or triggering event may be a manual trigger, e.g. a manual generation of a signal, or may be an automatic trigger, e.g. a trigger signal may be generated in the event of the exceeding or undershooting of a threshold. For example, the triggering event may be the determination of the event that a traffic volume threshold is exceeded. In particular, the dynamic switching of the GTP termination point may be initiated when an OpenFlow controller, e.g. implemented in the cloud, receives a trigger.

According to an exemplary embodiment of the method the GTP termination point is a default GTP termination point.

In particular, the default value or the default GTP termination point may be determined based on an Access Point Name (APN), where respective user equipment (UE) specific GTP encapsulation/decapsulation flows are initially created. For example, the default GTP termination point may be located or implemented at the fast path side or on the cloud side of a fast path.

According to an exemplary embodiment of the method the fast path switch acts as a router or a forwarder.

In particular, the fast path may act as a router with the help of a cloud resident control plane that may contain a routing process. For example, the fast path switch may act as a router on behalf of user plane virtual machines (VMs) forming GTP termination points and located or implemented in the cloud. For this purpose a flow entry, that forwards all GTP packets arriving from an S1 interface and destined to a user plane VM, may be created to the fast path.

Another flow entry may be created for a mobile IP address pool associated to the cloud APN.

According to an exemplary embodiment the method further comprises generating flow entries to a fast path connecting the cloud and the fast path node, wherein the generating is performed at a high priority.

In particular, the flow entries may be user specific GTP encapsulation/decapsulation flow entries. For example, the flow entries may be generated when a session associated with the GTP termination point is moved from the fast path to the cloud. The term "high priority" may particular denote that the priority is higher than a priority used for generating or creating flow entries to the fast path from user packets.

According to an exemplary embodiment the method further comprises moving a session from the fast path to the cloud.

In particular, the session may be moved from the fast path or fast path node to a virtual machine of the cloud, e.g. to a user plane VM having free capacity. Such a user plane VM may be selected or determined out of a group of VMs already running in the cloud or may be started newly. Furthermore, UE specific GTP encapsulation/decapsulation flow entries may be generated to the selected user plane VM and/or removed from the fast path.

According to an exemplary embodiment the method further comprises forwarding GTP packets to the cloud.

In particular, GTP packets that do not match in any UE specific GTP termination flows in the fast path may be forwarded to the cloud. Furthermore, GTP packets which do not have UE specific GTP termination flows in the cloud as well may be dropped.

Summarizing an exemplary specific embodiment may be based on the idea of providing a method or mechanism enabling a dynamical changing of a GTP termination point or mobility anchor point in a network entity or element, like a gateway, even during a session. In particular, exemplary embodiments introduce a mechanism how to dynamically switch the GTP termination point (mobility anchor) between the fast path and cloud. Since it can be assumed that GTP termination in the cloud causes more latency than termination in the fast path, there may be cases where it is advantageous to dynamically switch the GTP termination point of an existing session from cloud to the fast path (e.g. M2M case where motion detection starts video streaming). By providing a possibility to move dynamically a set of sessions to the cloud it may be possible to avoid overloading the fast path. In particular, the dynamic change or moving of the GTP termination point may avoid the necessity to recreate sessions when the GTP termination point or mobility anchor point shall be moved, e.g. in order to improve latency. The dynamic switching of GTP termination point between cloud and fast path may be a tool to decide the optimal GTP termination point for each user in real time. It may also make it possible to utilize cheap general purpose HW in the cloud as much as possible and keep minimum amount of state in the dedicated HW in the fast path.

The aspects and exemplary embodiments defined above and further aspects of the invention are apparent from the examples of embodiment to be described hereinafter and are explained with reference to these examples of embodiment.

BRIEF DESCRIPTION OF THE DRAWINGS

FIG. 1 schematically shows a virtualized Evolved Packet Core packet gateway.

FIG. 2 schematically shows a dynamic GTP termination in gateway according to an exemplary embodiment.

DETAILED DESCRIPTION

The illustrations in the drawings are schematic. In the following a detailed description of exemplary embodiments is given. In the beginning in the context of FIG. 1 some general remarks concerning a method or mechanism operating a network in particular a virtualized network are given.

FIG. 1 schematically shows a virtualized Evolved Packet Core (EPC) packet gateway 100. The EPC packet gateway 100 comprises a fast path node 101 which is typically implemented or formed by dedicated hardware. The fast path node 101 is connected to a cloud 102, typically formed by general purpose hardware, by a fast path 103. In particular, a serving gateway and/or packet data network gateway (P-GW) controller (schematically indicated by 104) is implemented in the cloud serving as a controller for the gateway. In principle, a GTP termination point 105 can be either implemented at the cloud side or at the fast path node side of the gateway as schematically depicted in FIG. 1. OpenFlow is used to interlink separated control plane and user plane, which is schematically indicated in FIG. 1 by the dotted line 106.

In context of FIG. 2 an exemplary embodiment of a method or mechanism of a dynamic GTP termination in a gateway will be described. It should be noted that this is a specific embodiment described and tailored for a cloud setup using OpenStack. In case other software is used for the cloud setup, details of the implementation may be different but can also be similar or identical.

In particular, FIG. 2 shows a gateway 200. The gateway 200 comprises a fast path node or fast path element 201 connected to the Internet 202 via a user plane interface SGi and to an enhanced NodeB 223 via a user plane interface S1. Furthermore, a first or fast path switch 203 is implemented in the fast path node 201 implementing some routing function. In addition the first switch may function as one possible GTP termination point 204 as indicated in FIG. 2. The fast path switch 203 is connected to a first tunneling-bridge (Br-tun) switch 205 functioning as an interface to a fast path connected to a compute node 206 and a cloud controller node/management node 207 comprising a second Br-tun switch 208 and a third Br-tun switch 209, respectively. It should be noted that the first, second and third Br-tun switches may be implemented as virtual switches.

The second Br-tun switch 208 of the compute node 206 is connected to an integration bridge Br-Int 210 connecting to virtual machines 211, 212 and 213 each may be configured for different functions or applications, e.g. forming a routing daemon, an S/P GW control or a user plane, which may form another dynamic GTP termination point 227. It should be noted that the cloud may of course comprise more than one compute node.

The third Br-tun switch 209 of the cloud controller node 207 is connected to another bridge 214 connected to DHCP servers 215 and 216 and in addition via a further switch 217 to an Ethernet interface 218 connected to an OpenStack external network 219.

In addition the gateway 200 comprises an OpenFlow controller schematically indicated in FIG. 2 by the ellipse 220 and used to dynamically changing or shifting the GTP termination point. The control is schematically indicated by the dashed lines 221 and 222 leading from the OpenFlow controller 220 to the first switch 203 and to the third virtual machine 213, respectively. In addition, FIG. 2 schematically indicates two different networks wherein a first cloud internal virtual network extending to the fast path (S1) is indicated by the dashed lines 223 while a second cloud internal virtual network extends to the fast path (SGi) is indicated by the solid lines 224.

In the virtualized S/P-GW virtual networks of the cloud (L2 segments) span out to the fast path element 201. This is achieved by means of connecting fast path element 201 to the same network, e.g. a L2 over GRE tunnel mesh network, as all the compute nodes 206 in the cloud.

The physical 3GPP user plane interfaces S1 and SGi are located in the fast path element 201. Therefore the entry point for all user data packets arriving to gateway 200 is via the fast path switch 203. This together with the fact that both the fast path switch 203 as well as the virtual switches 205, 208 and 209 in the cloud are under OpenFlow control makes it possible to change the GTP termination point dynamically for ongoing sessions.

This can be done in the following way:
1. The APN name decides the default GTP termination point (cloud or fast path) where the UE specific GTP encapsulation/decapsulation flows are initially created.
2. The fast path switch acts as a router on behalf of user plane VMs (GTP termination points) located in the cloud. For this purpose a flow entry, that forwards all GTP packets arriving from S1 interface destined to a user plane VM, is created to the fast path (indicated as arrow 225 in FIG. 2). Another flow entry is created for the mobile IP address pool associated to the cloud APN (indicated as arrow 226 in FIG. 2).
3. The dynamic switching of GTP termination point is initiated when OpenFlow controller receives a trigger (e.g. traffic volume threshold that is exceeded or manual).
4. When moving a session from cloud to fast path the UE specific GTP encapsulation/decapsulation flow entries are created to the fast path with higher priority than the flows explained in step 2 above.
5. When sessions are moved from fast path to the cloud the user plane VM with free capacity may be selected or possibly a new one is started, the UE specific GTP encapsulation/decapsulating flow entries are created to that VM and removed from the fast path. In the fast path the flow entries described in step 2 above are used when UE specific flows do not exist.
6. GTP packets that do not match in any UE specific GTP termination flows in the fast path are forwarded to the cloud. GTP packets, that do not have UE specific GTP termination flows in the cloud either, are dropped.

It should be noted, that the dynamic GTP termination point switching may be an internal functionality of gateway 200 and may not be visible to other network elements or network entities.

In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

LIST OF REFERENCE SIGNS

100 EPC packet gateway
101 fast path node
102 cloud
103 fast path
104 controller
105 GTP termination point
106 using of OpenFlow
200 gateway
201 fast path node
202 Internet
203 fast path switch
204 GTP termination point
205 first Br-tun switch
206 compute node
207 cloud controller node/management node
208 second Br-tun switch
209 third Br-tun switch
210 integration bridge
211-213 virtual machines
214 bridge
215, 216 DHCP servers
217 switch
218 Ethernet interface
219 external network
220 OpenFlow controller
221, 222 control path
223 first network
224 second network
225 creation of flow entry
226 creation of flow entry
227 GTP termination point

LIST OF ABBREVIATIONS

APN Access Point Name
EPC Evolved Packet Core
GTP GPRS Tunnelling Protocol
NFV Network Functions Virtualization
ONF Open Networking Foundation
P-GW Packet data network Gateway
SDN Software Defined Networking
S-GW Serving Gateway
UE User Equipment
VM Virtual Machine

The invention claimed is:

1. A method of operating a network entity of a network comprising a gateway, the method comprising:
dynamically changing a general packet radio service tunneling protocol (GTP) termination point in a user plane of the gateway from a cloud GTP termination point in the control plane to a physical GTP termination point in the user plane, or from the physical GTP termination point in the user plane to the cloud GTP termination point in the control plane,
wherein the dynamic changing from the cloud GTP termination point in the control plane to the physical GTP termination point in the user plane, or from the physical GTP termination point in the user plane to the cloud GTP termination point in the control plane is initiated by exceeding a traffic volume threshold.

2. The method according to claim 1, wherein the gateway is a virtualized gateway.

3. The method according to claim 1,
wherein the gateway further comprises a fast path node including a fast path switch, and
wherein the user data packets arrive at the gateway via the fast path switch.

4. The method according to claim 1, wherein the gateway further comprises a cloud comprising a virtual switch connected to a fast path switch.

5. The method according to claim 4, wherein the virtual switch of the cloud and the fast path switch operate on the same communication protocol.

6. The method according to claim 3, wherein the fast path switch acts as a router or a forwarder.

7. The method according to claim 4, further comprising generating flow entries to a fast path connecting the cloud and the fast path node, wherein the generating is performed at a high priority.

8. The method according to claim 4, further comprising moving a session from the fast path to the cloud.

9. The method according to claim 4, further comprising forwarding GTP packets to the cloud.

10. A network entity for a network comprising a gateway, the network entity comprising:
a processor; and
memory storing computer program code,
wherein the memory and the program code are configured to, with the processor, cause the network entity at least to dynamically change a general packet radio service tunneling protocol (GTP) termination point in the gateway from a cloud GTP termination point in the control plane to a physical GTP termination point in the user plane, or from the physical GTP termination point in the user plane to the cloud GTP termination point in the control plane,
wherein the dynamic changing from the cloud GTP termination point in the control plane to the physical GTP termination point in the user plane, or from the physical GTP termination point in the user plane to the cloud GTP termination point in the control plane is initiated by exceeding a traffic volume threshold.

11. A network comprising at least two network entities according to claim 10 which are connected to each other by a communication link.

12. A non-transitory computer-readable medium, in which a computer program is stored, which, when being executed by a processor, is configured to carry out a method according to claim 1.

13. The network entity according to claim 10, wherein the gateway is a virtualized gateway.

14. The network entity according to claim 10,
wherein the gateway further comprises a fast path node including a fast path switch, and
wherein the user data packets arriving at the gateway via the fast path switch.

15. The network entity according to claim 10, wherein the gateway further comprises a cloud comprising a virtual switch connected to a fast path switch.

16. The network entity according to claim 15, wherein the virtual switch of the cloud and the fast path switch operate on the same communication protocol.

17. The network entity according to claim 14, wherein the fast path switch acts as a router or a forwarder.

18. The network entity according to claim 15, wherein the memory and the program code are further configured to, with the processor, cause the network entity at least to generate flow entries to a fast path connecting the cloud and the fast path node, wherein the generating is performed at a high priority.

\* \* \* \* \*